US008966481B2

(12) United States Patent
Sandland et al.

(10) Patent No.: US 8,966,481 B2
(45) Date of Patent: *Feb. 24, 2015

(54) COMPUTER PROGRAM CODE AND METHOD FOR DELIVERING EXTERNAL DATA TO A PROCESS RUNNING ON A VIRTUAL MACHINE

(75) Inventors: Carl Sandland, Braddon (AU); Matthew Patrick Herscovitch, Chapman (AU); Timothy Brian Dingwall, Waniassa (AU)

(73) Assignee: ActivIdentity (Australia) Pty. Ltd., Deakin Australian Capital Territory (AU)

( * ) Notice: Subject to any disclaimer, the term of this patent is extended or adjusted under 35 U.S.C. 154(b) by 284 days.

This patent is subject to a terminal disclaimer.

(21) Appl. No.: 13/456,647

(22) Filed: Apr. 26, 2012

(65) Prior Publication Data
US 2013/0061308 A1 Mar. 7, 2013

Related U.S. Application Data (63) Continuation of application No. 12/498,130, filed on Jul. 6, 2009, now Pat. No. 8,191,086, which is a continuation of application No. 10/369,268, filed on Feb. 14, 2003, now abandoned.

(51) Int. Cl.
*G06F 9/455* (2006.01)
*G06F 17/30* (2006.01)
*G06F 9/44* (2006.01)
*G06F 21/41* (2013.01)
*H04L 29/06* (2006.01)

(52) U.S. Cl.
CPC .......... *G06F 9/4443* (2013.01); *G06F 9/45537* (2013.01); *G06F 21/41* (2013.01); *H04L 63/0815* (2013.01)
USPC ...................................... 718/1; 726/8; 726/26

(58) Field of Classification Search
None
See application file for complete search history.

(56) References Cited

U.S. PATENT DOCUMENTS 5,935,251 A * 8/1999 Moore ............................ 726/18
2003/0061512 A1 * 3/2003 Flurry et al. ................... 713/201
2003/0105888 A1 * 6/2003 Connelly et al. .............. 709/331

* cited by examiner

*Primary Examiner* — Charles E Anya
(74) *Attorney, Agent, or Firm* — Muirhead and Saturnelli, LLC (57) ABSTRACT

A method and system for delivering external data to a process running on a virtual machine, the virtual machine running on an operating system. The method includes the steps of executing instructions on the virtual machine that obtain state data related to the process; querying the virtual machine to obtain component data related to the state data; and manipulating the component data to deliver the external data to the process. In one example, the system provides a single sign-on application that passes user credentials to a Java applet running on a Java virtual machine.

4 Claims, 10 Drawing Sheets

COMPUTER PROGRAM CODE AND METHOD FOR DELIVERING EXTERNAL DATA TO A PROCESS RUNNING ON A VIRTUAL MACHINE

RELATED APPLICATIONS

This application is a continuation of U.S. application Ser. No. 12/498,130, filed Jul. 6, 2009 (pending), which is a continuation of U.S. application Ser. No. 10/369,268, filed Feb. 14, 2003 (abandoned), the entire contents of which are incorporated by reference herein.

BACKGROUND OF THE INVENTION

1. Field of the Invention

The present invention relates to computer program code and a method for communicating with a process running on a virtual machine. By way of illustrative example of a preferred embodiment of the present invention reference will be made to a single sign-on application that passes user credentials to a Java applet running on a Java Virtual Machine. It is to be understood however that the present invention is applicable for communicating with a process running on a virtual machine in contexts other than single sign on applications.

It is also to be understood that the term "process" it to be understood as having a broad meaning encompassing any executable computer code or data, whether compiled or interpreted, including but not limited to threads, procedures, scripts and programs.

2. Discussion of the Related Art

When computers were first deployed, such as in a work environment, there was generally a single computer, (such as mainframe or minicomputer) shared by a number of users, who accessed the computer via "dumb" terminals. A user would authenticate their identity when logging in by entering a user name and password into their terminal and thereby gaining access to the resources (i.e. programs and data) of the computer. Since there was only a single computer, the authentication process only had to be performed once per user session.

With the establishment of local area networks linking PCs and/or workstations, minicomputers and mainframes, users often had to authenticate themselves to their own workstation to gain initial access to the network, and then separately to each network node on which a required resource resided. However, the maximum number of nodes on local area networks was fairly constrained, meaning that the number of different log-in names and passwords that a user needed to know was manageable.

Figure 1:
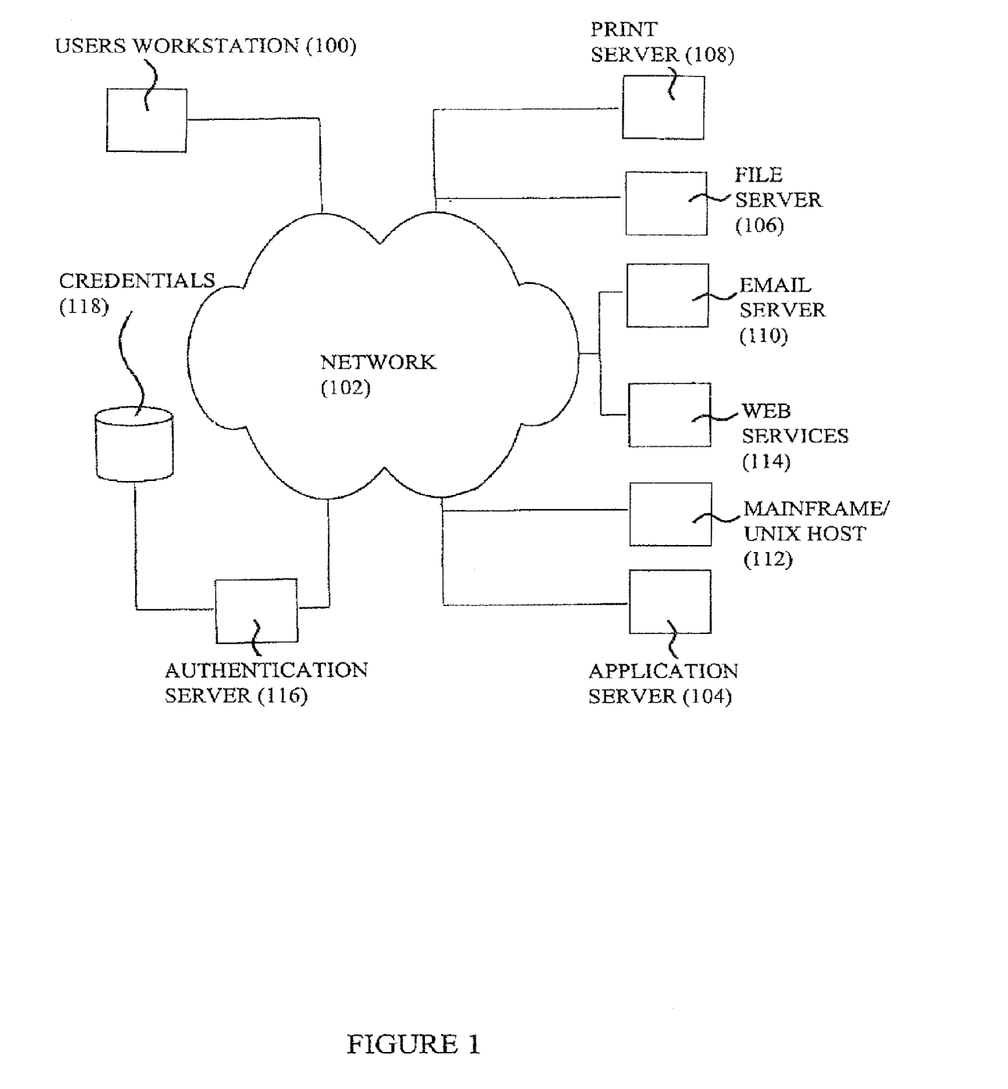
FIG. 1 is a block diagram illustrating the resources available to a user workstation via network connectivity as occurs in the prior art.

Most local area networks are now connected to wide area networks and principally the Internet. With Internet connectivity users have access to effectively limitless resources residing on globally dispersed network nodes. For example, as illustrated in FIG. 1, a user workstation 100, such as a PC, is connected to a network 102. Typically the workstation 100 is connected to a local area network (LAN). In turn, the LAN is connected via an Internet Service Provider (ISP) (not shown) to a router (not shown) that provides access to the Internet. The LAN may also be connected via the telephone system to other LANs to form extranets. The network 102 illustrated in FIG. 1, refers to LANs (including extranets), wide area networks and the Internet.

Network connectivity allows user access to resources residing on an Application Server 104 that runs applications for the user and delivers output to the user workstation 100. Applications may also run directly on the user workstation and have access to file servers 106, print servers 108 and email servers 110 residing on the LAN or on other networks including the Internet.

The user workstation 100 also has access to resources on a mainframe/Unix Host 112 that are accessed via terminal emulator software, using a protocol such as TN 3270, running on the user workstation. Network connectivity also allows access to any number of services 114 available on the World Wide Web, such as internet banking, online auctions, online retailers, commercial databases (such as Lexis or Dialog) and web mail Potentially, a user may have to authenticate themselves each time they wish to access a particular resource, meaning that a large volume of authentication credentials (such as user names, and passwords) needs to be remembered. Additionally, for security purposes, many services require that a password be changed on a regular basis, thus adding to the confusion and difficulty in managing authentication credentials.

In an attempt to better manage authentication of user credentials Single Sign On (SSO) systems have been developed. SSO allows automation of the authentication process, whereby users authenticate themselves once, with the SSO system then managing subsequent authentications if and when required. In some cases, SSO is provided by an authentication server 116, accessible to the user work station 100 over the network 102. Alternatively, the SSO system can run directly on the user workstation 100 or on both the workstation 100 and server 116. A database (such as an X.500 based Directory) of authentication credentials 118 is accessible to the SSO system. For security purposes the authentication credentials are stored in encrypted form.

Figure 2:
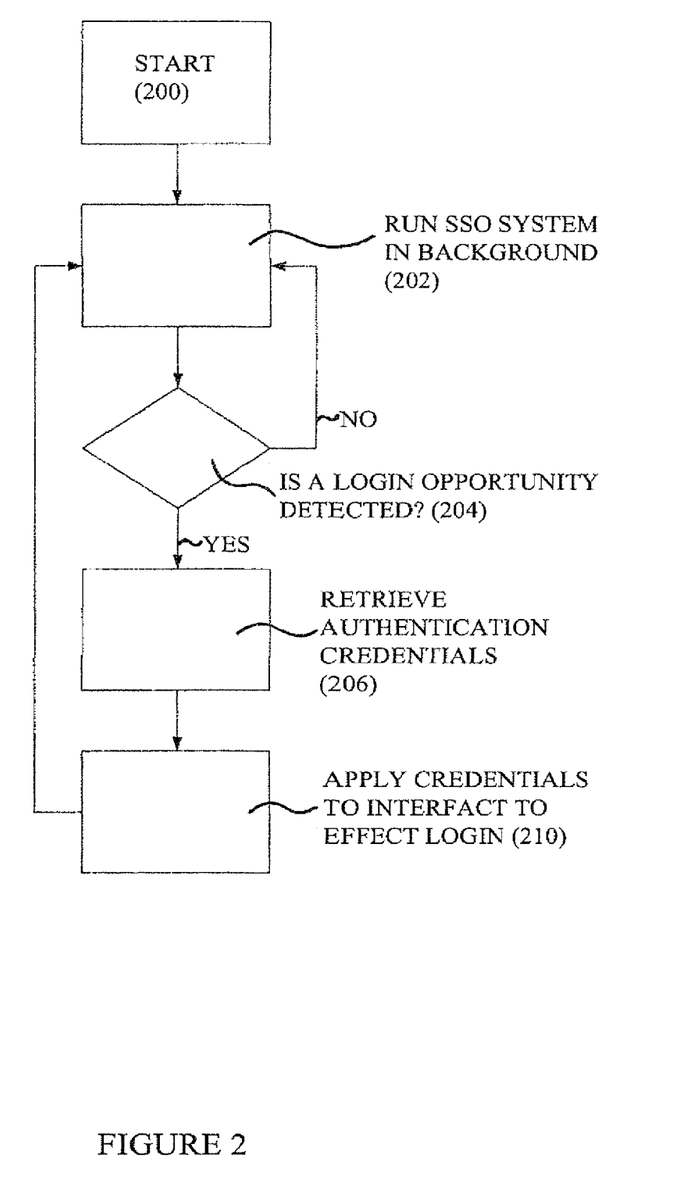
FIG. 2 is a flow chart illustrating the operation of an SSO system as occurs in the prior art.

An overview of an SSO system is given by reference to FIG. 2. Generally, the SSO system runs as a background process on the user workstation 100 in step 202. At step 204, data that is indicative of the state of a user interface (hereinafter referred to as "user interface state data") presented on the user workstation is examined to detect whether there is a log-in opportunity. This step is typically implemented via services provided by the operating system as understood by those skilled in the art. For example the Windows operating system provides application programming interfaces (API's) that allow an application to be notified of various user interface events. This mechanism, known as "Windows hooking", allows the application to determine when a window is created, what the window contains and properties of the window such as its title, position and others. After detecting a log-in opportunity at step 206, the SSO system determines the particular resource related to the log-in opportunity (such as application, mainframe, web service etc) and retrieves the relevant authentication credentials from the database 118. These credentials are then applied at step 210 to the user interface object, such as by entering the user name and password to thereby complete the authentication process. The user is thus relieved from having to remember and enter the correct user name and password to access a particular resource.

Figure 3:
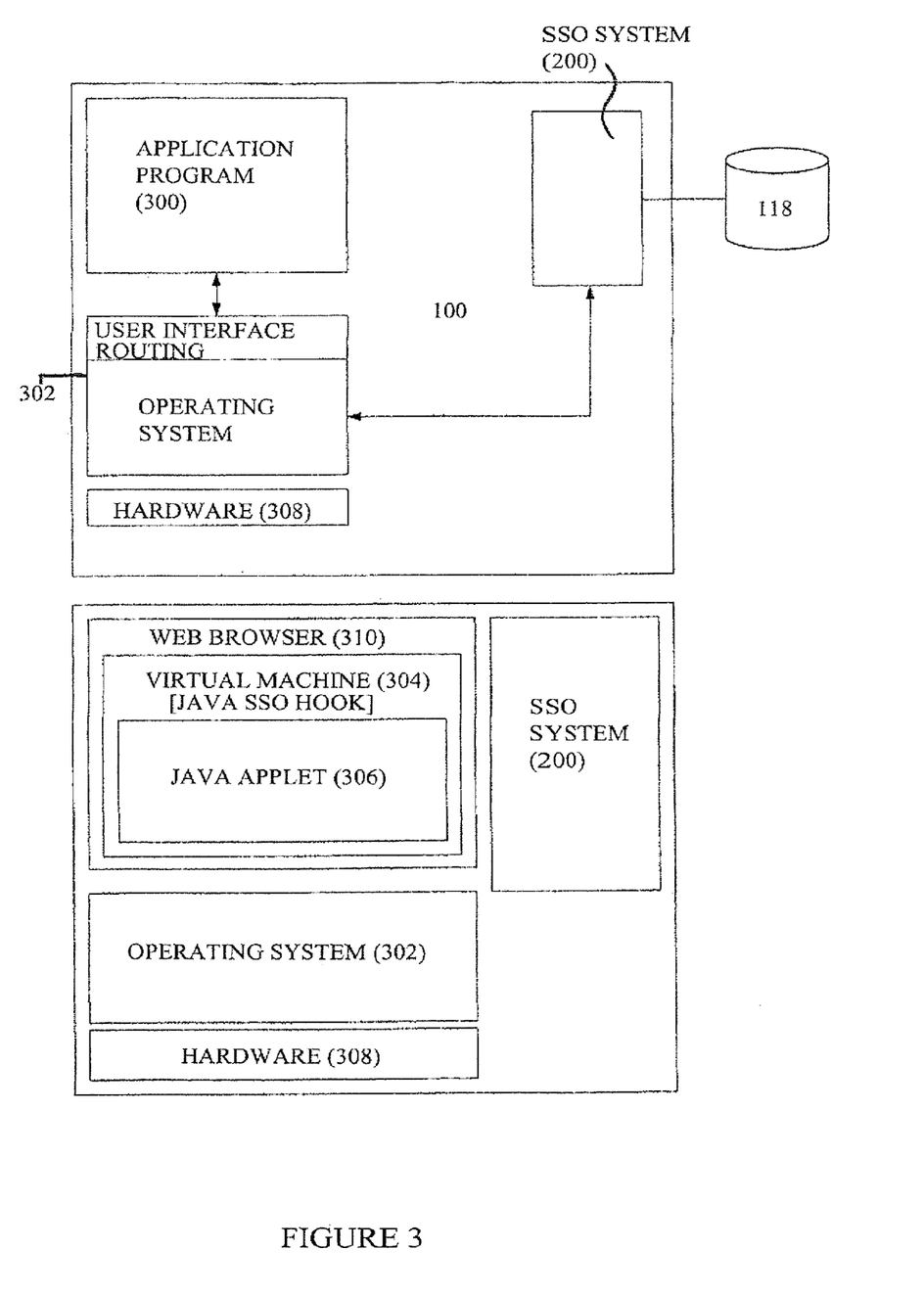
FIG. 3 is a block diagram illustrating an application program running on an operating system and a Java applet running on a Virtual Machine inside a Web Browser.

The resources accessed by the SSO system may exist on the user workstation 100 as an application program, as is illustrated in FIG. 3. In this case, an application program 300 (for example a terminal emulator or email client) uses operating system 302 services such as a user interface 304 to perform its tasks. The SSO system 200 is also an application program that, as noted above, uses operating system services to authenticate the user to particular resources.

However, some resources do not exist as an application program running directly on the operating system 302, but rather as a process running on a virtual machine 304. A virtual machine can be described as a software simulated machine providing the operational equivalent of a real machine that does not exist as a physical entity per se. A virtual machine 304 takes instructions from a process 306 and converts them to instructions that are recognisable by the operating system 302 and hardware 308 on which the virtual machine 304 runs.

Figure 4:
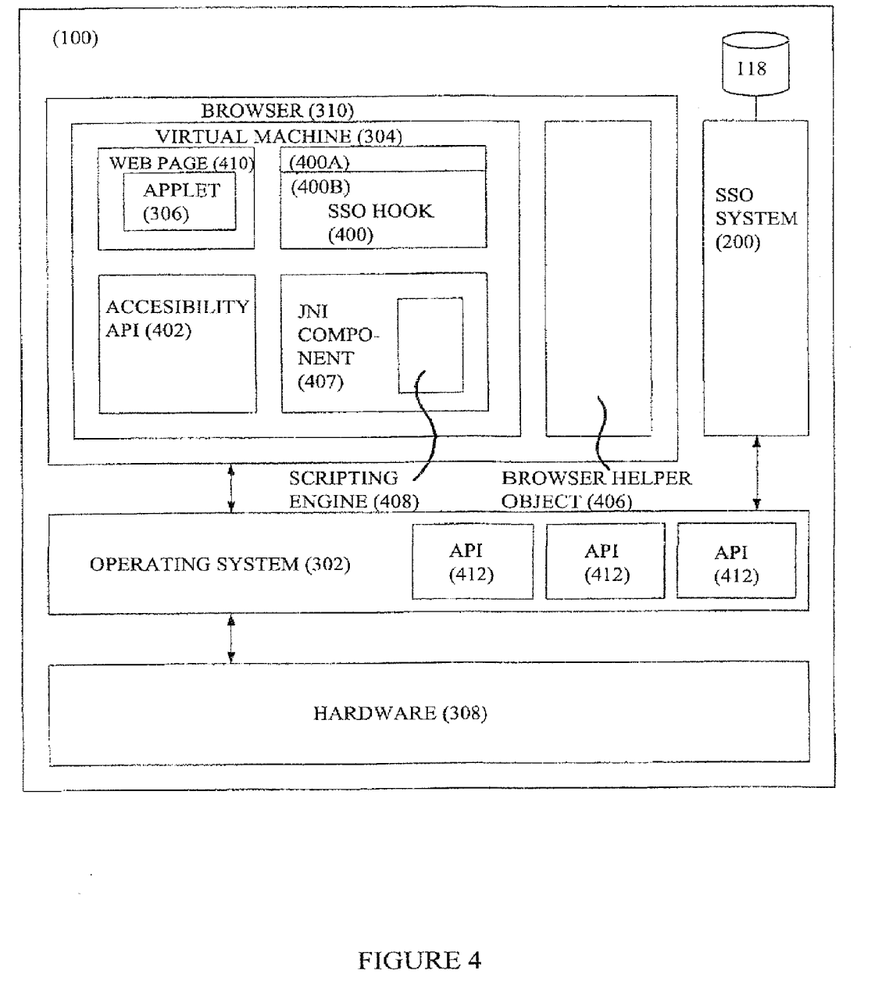
FIG. 4 is a block diagram illustrating the components of the software product of the present invention.

For example, as illustrated in FIG. 4 a web browser 310 such as Microsoft Internet Explorer exists as an application program running on an operating system 302 (such as Microsoft Windows), which in turn is running on particular hardware 308 (such as an Intel processor with memory and peripherals). The web browser 310 implements a virtual machine 304 on which processes may be run. In particular, a Java applet 306 delivered as part of a web page to the web browser 310 over the internet 102, exists as a process that runs on the virtual machine 304 (for example the JVM developed by Sun Microsystems).

The Java applet uses services provided by the virtual machine, to instructions recognisable by the operating system 302 and hardware 308 implementing the virtual machine 304. The Java programming language was developed by Sun Microsystems and has been successful due to its cross platform portability, in that a single Java program may be written for any platform that implements the JVM. Thus, the same applet may be written for and run on a platform employing, for example, the Microsoft, Unix, Linux or Macintosh operating system or indeed any platform that implements a JVM.

Numerous web based services provide authentication prompts, such as requests for user names and passwords via a Java applet that is downloaded to the user's browser and runs on a virtual machine. An effective SSO system would allow authentication to any resource, irrespective of how the resource exists on a user workstation 100. Whilst current SSO systems allow accurate authentication to a resource existing as an application program, they are less successful where the resource exists as a process running on a virtual machine. Thus SSO systems could be improved to allow authentication into a virtual machine. Also, it would be advantageous to communicate with processes running on virtual machines for other purposes.

SUMMARY OF THE INVENTION

1. Object of the Invention

The present invention aims to provide an alternative to known software products and methods of the type referred to above. More particularly, the invention aims to provide a computer software product and method that allows communication with a process running on a virtual machine.

2. Disclosure of the Invention

According to a first aspect of the present invention there is provided a method for delivering external data to a process running on a virtual machine, said virtual machine running on an operating system, the method including the steps of:

executing instructions on the virtual machine that obtain state data related to the process;

querying the virtual machine to obtain component data related to the state data; and manipulating the component data to deliver the external data to the process.

Typically the process implements a user interface and the state data is user interface state data. The user interface is generally a graphical user interface (GUI) and the user interface state data preferably indicates the creation of a top level window in the GUI.

Optionally the instructions utilise an applications program interface (API) running on the virtual machine to obtain the state data. It has been found that an accessibility API is a suitable API and that the state data may be obtained by using an accessibility API to hook the virtual machine process.

The process may for example be an applet or an application.

Prior to the querying step, the method may include the optional steps of calling a second process that executes outside the virtual machine and obtaining attribute data relating to the state data from the second process.

The attribute data may include any one or more of:

a location indicator specifying a directory containing a main Class file of the applet, a name of the main Class file, a unique identifier allocated by the operating system to a parent window of the applet, and a time value representing the time when GUI objects created by the applet were loaded and displayed.

Preferably the attribute data is forwarded for use by the instructions executing on the virtual machine and may be forwarded in a UDP packet.

The instructions executing on the virtual machine may be additionally operative to:

determine the unique identifier allocated by the operating system to a parent window of the applet; and confirm that the unique identifier determined by the virtual machine instructions matches the unique identifier allocated externally by the operating system.

The external data is preferably delivered to the parent window identified by the unique identifier.

The external data could, for example be a login script for entering authentication credentials into the process.

According to a second aspect of the present invention there is provided computer program code for carrying out the method of the first aspect of the invention.

According to a third aspect of the present invention there is provided a Single Sign On System including:

a computer terminal;

an operating system installed on said computer terminal;

a virtual machine running on the operating system;

a server communicatively coupled to the computer terminal;

a Java applet stored at the server, the applet including instructions that when executed on a virtual machine define a user interface a browser installed on said computer terminal operative to download the Java applet from the server and run the Java applet on the virtual machine;

a database of authentication credentials accessible to the computer terminal; and instructions executable on the virtual machine operative to:

obtain user interface state data from the Java applet;

query the virtual machine to obtain component data related to the user interface state data; and manipulate the component data so as to deliver authentication credentials to the Java applet.

The software product method and system of the present invention allows communication with a process running on a virtual machine and can be used to implement an SSO system. In addition the present invention could be utilised in any situation where communication with virtual machine processes is required, such as for testing software code written to be executed on a virtual machine.

BRIEF DESCRIPTION OF THE DRAWINGS

A preferred embodiment of the present invention will now be described with reference to the following drawings, in which like reference numbers denote the same element throughout and wherein.

DESCRIPTION OF THE PREFERRED EMBODIMENTS

Turning to FIG. 4, there is illustrated the user workstation 100, which is a PC having conventional hardware 308, on which an Operating System 302, such as Microsoft Windows is running. Two application programs, being a web browser 310 and an SSO system 200 are running on the Operating System 302. A virtual machine 304 such as the JVM is implemented within the web browser 310 that allows a Java applet 306, downloaded from the Internet with a web page 410 to run on the user workstation. The applet 310 is written in the Java programming language and uses services provided by the virtual machine to perform its tasks and actually runs on the virtual machine 304 as a thread inside the browser process 302. The program instructions of the applet will be converted by the virtual machine 304 into instructions that can be executed by the operating system 302. The conversion process, however, is hidden from the applet 306 that needs only to call services that are provided by the virtual machine. In turn, the operating system 302 implements the necessary routines from the hardware 308 to execute the converted instructions.

The task of the applet 306 in this example is to request the entry of a user name and password from the user of the workstation 100, to allow the user access to resources provided at the web server from which the web page 410 was obtained. To accomplish this task, a user interface object such as a window with text entry boxes to receive a user name and password must be created in a graphical user interface. Application programs running on the operating system 302 utilise APIs 412 provided by the operating system 302 to create such objects. In the case of Microsoft's 32 bit Windows Operating Systems the relevant APIs are known as "Win32" and application programs that rely on these APIs are known as Win32 applications. Also, as was noted above, the operating system 302 may also provide APIs that allow an application program to be notified of user interface events, such as the creation of a window in the graphical user interface (GUI).

However, in recent Java graphical user interface (GUI) frameworks only the browser 310 window that contains the top level Java window ("the applet frame window") is a Win32 window, with other user interface objects appearing to the operating system as a privately managed screen area. Thus where a window, other than an applet frame window, is created by the Java applet 306 running inside the virtual machine 304, data that is indicative of the state of a user interface (the "user interface state data"), except for title of the Window, is not accessible to application programs, including the SSO system 200. It is for this reason that current SSO systems are not suited to authenticating users to services that exist as processes running on a virtual machine.

To provide access to this user interface state data, an Accessibility API 402 also runs on the virtual machine 304. An example of an Accessibility API that is suitable for implementing the present invention is the Java Accessibility API that was designed by Sun Microsystems to allow third party applications and in particular those used by the disabled (for example Braille readers, speech synthesisers, image enlargers etc) to interact with Java applets. It has been surprisingly found that an Accessibility API provides access to crucial user interface state data that can be used by the SSO system 200 to pass data from a process running outside the virtual machine ("external data") into the applet.

The present invention works best with versions 6 and above of Microsoft's Internet Explorer having the Javasoft Runtime Environment ("JRE") plugin with Accessibility API installed. Accessibility should be appropriately enabled through the awt.properties and Accessibility.properties files residing on the appropriate JRE.

An SSO Hook 400, written in the Java programming language, also runs on the virtual machine 304 with the applet 306 and the Accessibility API 402. The SSO Hook 400 can be registered with the Accessibility API 402 to obtain state data relevant to the applet 306. Additionally the SSO Hook 400 also includes instructions for forwarding external data from the SSO System 200, to the applet 306 by manipulating the state data obtained from the Accessibility API 402.

Also running on the virtual machine 304 is a Java Native Interface ("JNI") Component the functionality of which is detailed below.

Outside the virtual machine is a Win32 Component Object Model ("COM") component known as a Browser Helper Object (BHO) 406, again having functionality that is detailed further below.

Figure 5:
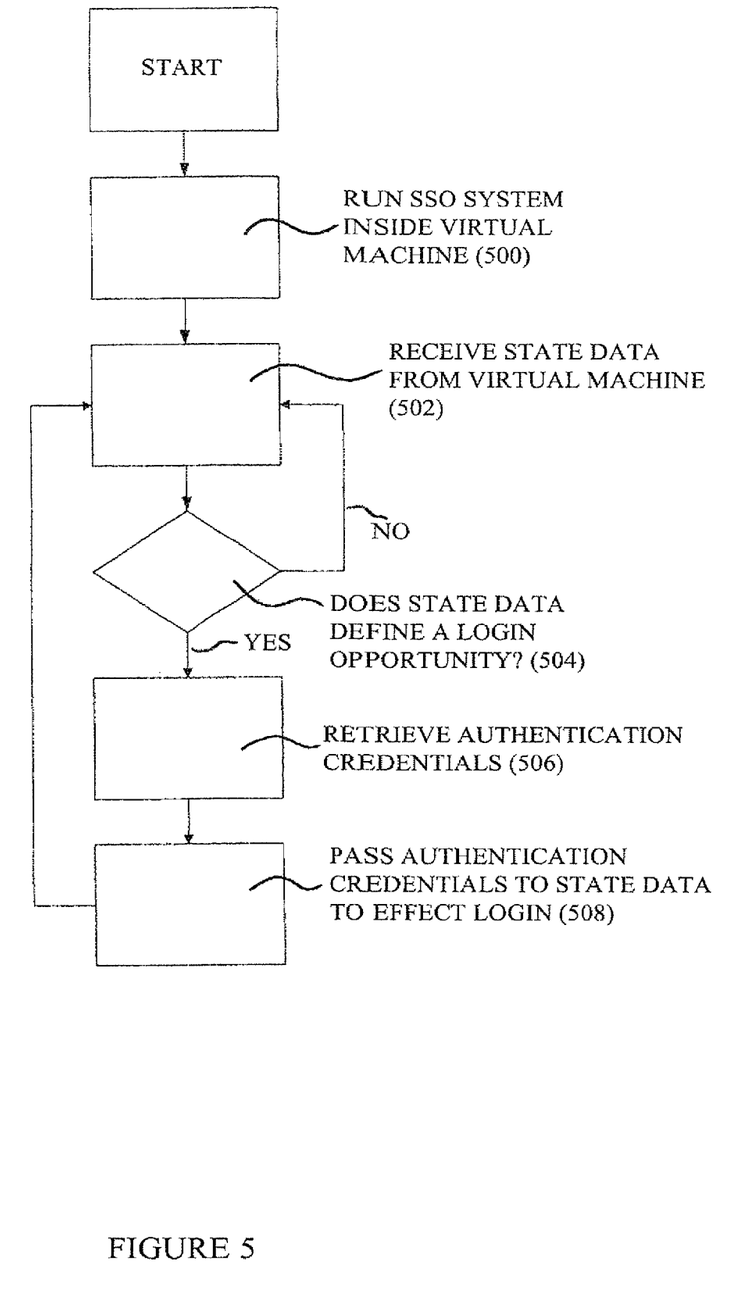
FIG. 5 is a flow chart illustrating a high level view of the process carried out by the software product of the present invention.

A high level view of the operation of the components of the invention described in FIG. 4 is given by reference to FIG. 5. At step 500, the SSO System 200 causes the SSO Hook 400 to execute on the virtual machine 304 as a background process. User Interface State Data is then received at step 504 and examined by the SSO Hook 400. At step 504 a test is carried out to determine whether the User Interface State Data defines a login opportunity related to the Java applet 306, running on the virtual machine 304. In the event that a login opportunity is defined the relevant authentication credentials are retrieved from the database 118 at step 506. These credentials are then applied to the Java applet in step 508 to effect the authentication.

Figure 6:
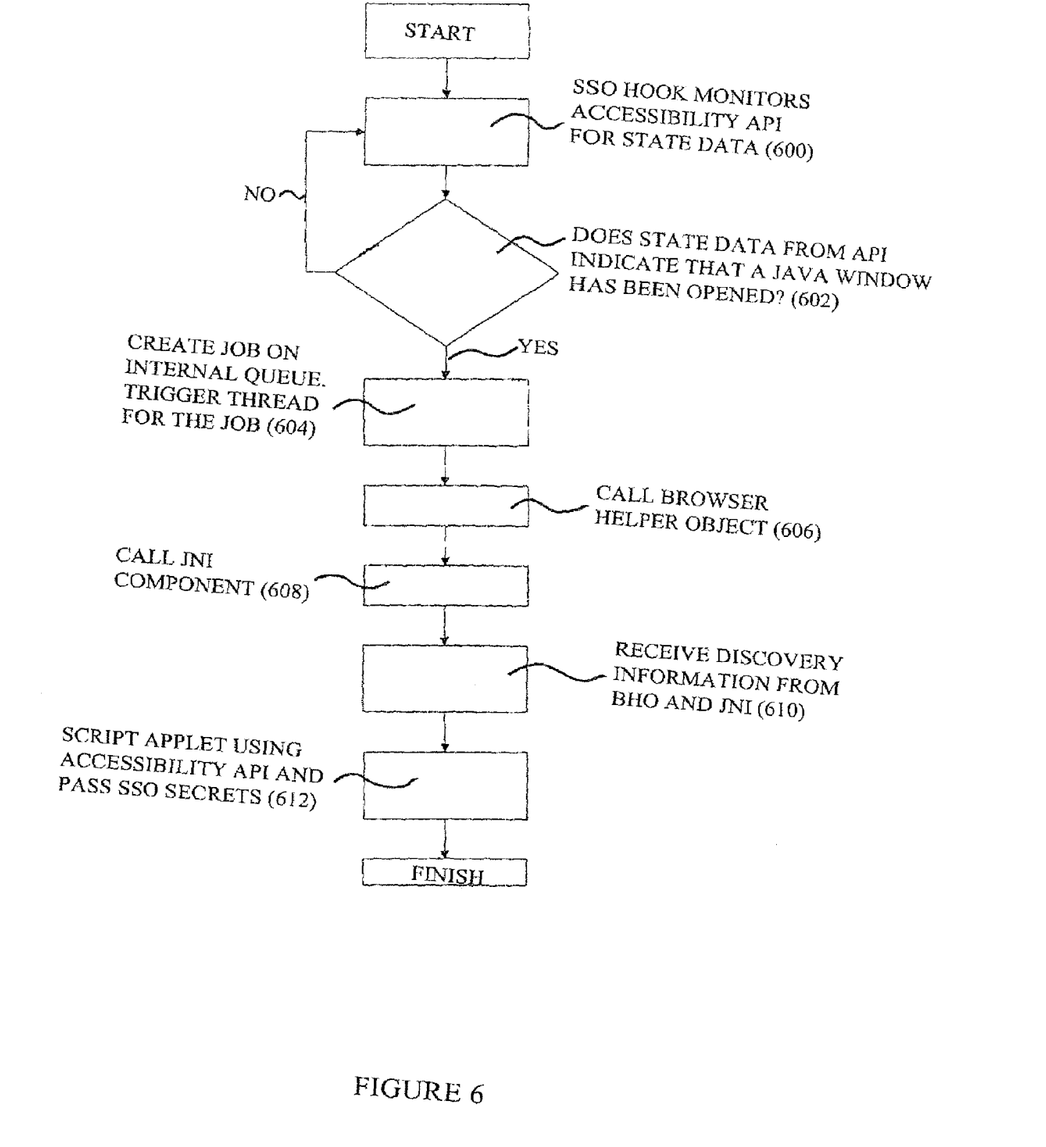
FIG. 6 is flow chart illustrating the process carried out by the SSO Hook in receiving user interface state data and calling the other components of the software product.

The initial stage of the process commences when the SSO Hook 400 executes on the virtual machine 304 and this stage is illustrated in more detail by reference to FIG. 6. At step 600, the SSO Hook 400 uses the Accessibility API to determine if there is any relevant user interface state data from the Java applet 306 running on the virtual machine 304. Specifically, the Accessibility API will notify the SSO Hook whenever a top level window (being the main window in the window hierarchy for the applet) is created by a Java applet. Although the creation of a top level Window is often discoverable using the standard Win32 hooking mechanisms only the title of the window is available to an application. This is not the case where an Accessibility API is used. Upon notification by the Accessibility API the SSO Hook 400 examines various attributes of the top level window discovered by the Accessibility API including but not limited to its title, class, child windows and controls.

In the case of a Java Application Program, as opposed to an applet, it has been found that sufficient component data can be obtained from the state data to enable sign on data to be passed to the Application Program at this point. Where the process is an applet, further steps need to be taken, as is further described below.

A test is performed at step 602 to determine whether the user interface state data received from the Accessibility API 402 indicates that a top level window has been created by the applet. In the event that such a window has been created a job is created on an internal queue and a thread is triggered for that job at step 604. The BHO 406 is then called at step 606, followed by the JNI component 407 at step 608. Subsequent to calling these components the SSO Hook 400 waits at step 610 to receive attribute data from the BHO 406 and the JNI component 407. After receiving the attribute data at step 612 the SSO Hook 400 is ready to pass external data to the Java applet 306.

As just noted, the BHO 406 is called by the SSO Hook 400 after the SSO Hook 400 has detected the opening of a top level window by the applet 306. The processes carried out by the BHO 406 are described in more detail by reference to FIG. 7. The BHO 406 checks at step 700 whether a new job has been placed on the queue by the SSO Hook 400. For each new job the BHO 406 obtains attribute data about the relevant applet at step 702. The BHO hooks into the browser 304 running the virtual machine 304 to obtain the discovery information. The practice of hooking was discussed above and uses an interface supplied by the Microsoft Corporation that is documented in the Microsoft Developer Network Manuals, the contents of which are hereby incorporated by reference.

Figure 7:
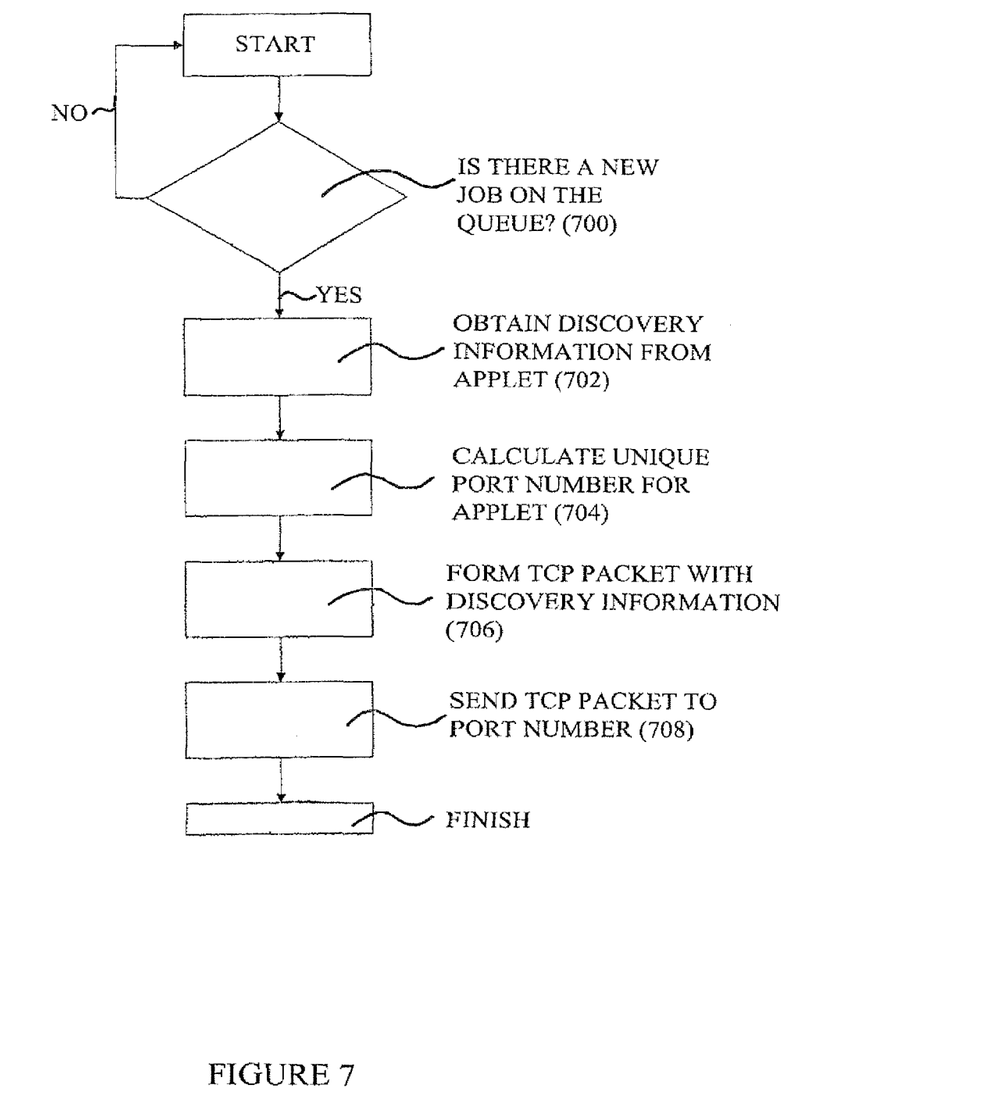
FIG. 7 is a flow chart illustrating the process carried out by the Browser Helper Object after being called by the SSO Hook.

The attribute data such hooked from the browser 302 includes firstly a full URL that completely specifies the directory containing the main Class file of the applet 306. A correct URL of the applet is required to know which credentials from the database 118 to apply to the applet 306.

Secondly, the attribute data includes the "Codebase" attribute of the applet which is the name of the main. Class file located in the directory identified by the URL. Actual execution of the applet 306 on the virtual machine 304 begins with the main Class file.

Thirdly, the attribute data includes a unique identifier, allocated by the operating system 302 of the frame window of the browser 304 housing the applet 306 which is also the parent window of the applet 306. In the case of a Windows Operating System this identifier is a variable of type HWND and is also know as a "window handle". This data is particularly important where there is more than one browser running at once as it ensure that the user credentials from the database are forwarded to the correct window.

Fourthly, the attribute data includes the exact time when the GUI objects created by the applet 306 were loaded and been displayed.

A unique port number is calculated for the applet at step 704. The calculation of the unique port number relies on the fact that each of the applet 306, BHO 400 and SSO Hook are all identified by the same operating system 302 process number. The port number is then used for communications between the BHO and SSO Hook. A Transmission Control Protocol (TCP) packet is formed at step 706 that contains the attribute data obtained at step 702. The attribute data is forwarded at step 708 to the port number created at step 704.

Figure 8:
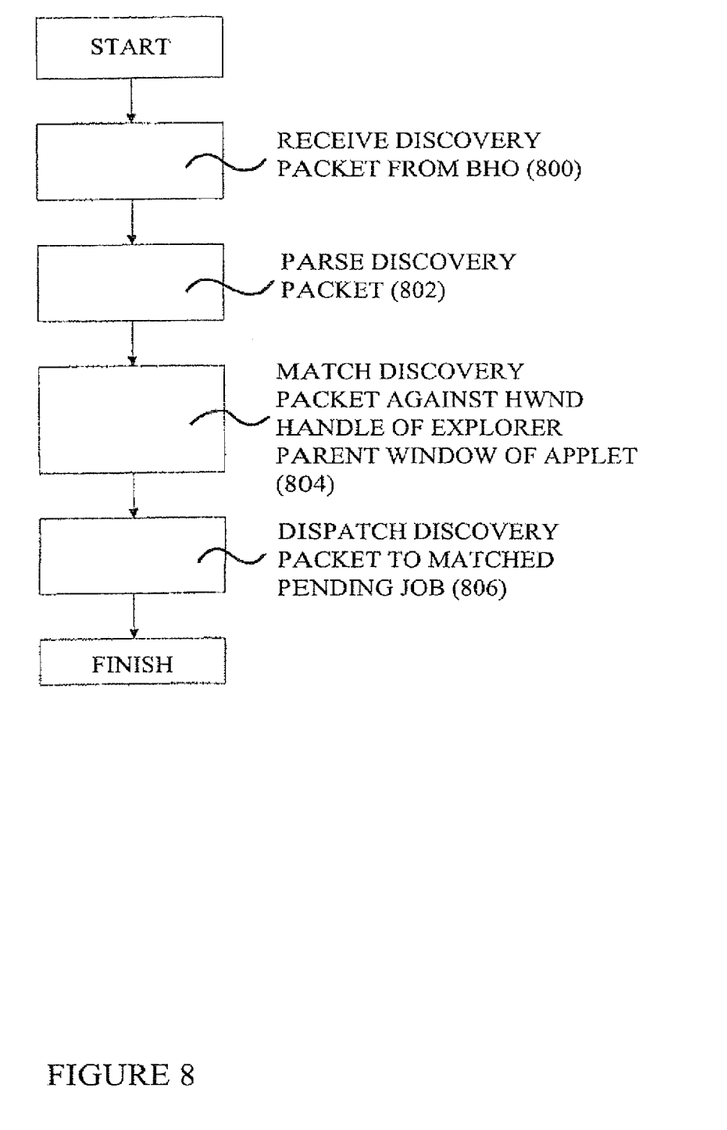
FIG. 8 is a flow chart illustrating the process carried out by the SSO Hook after receiving a discovery packet from the Browser Helper Object.
Figure 9:
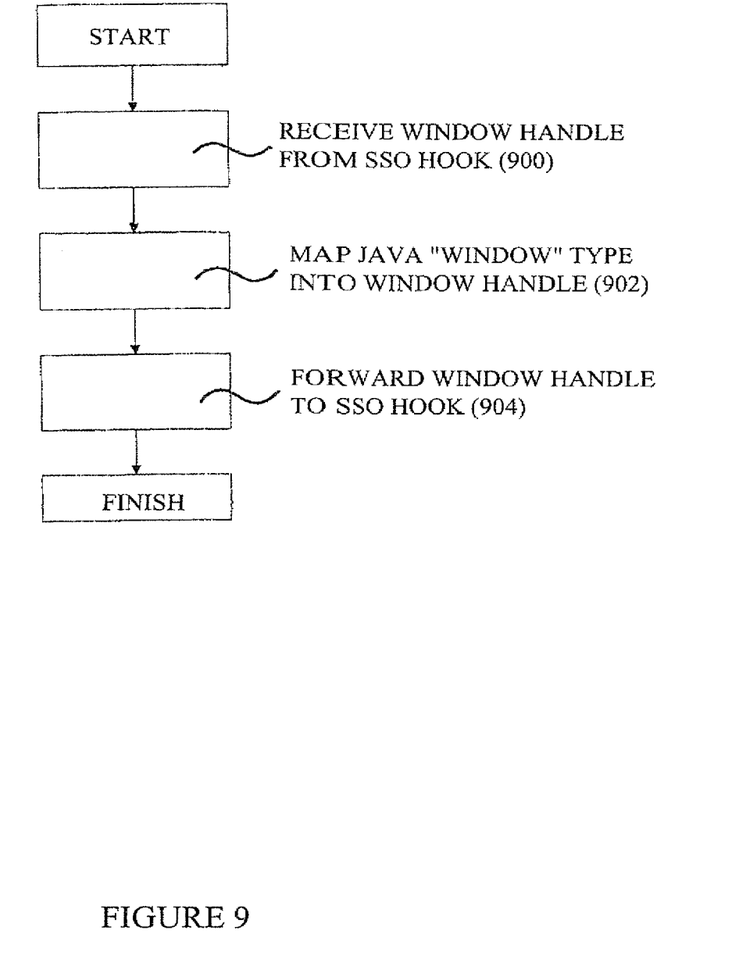
FIG. 9 is a flowchart illustrating the process carried out by the SSO Hook in passing a login script to a Window opened by the Java Applet running on the virtual machine.

The TCP packet is forwarded back inside the virtual machine for use by the SSO Hook 400 as described by reference to FIG. 8. After receiving the TCP packet ("the discovery packet") from the BHO 406 at step 800, the SSO Hook 400 parses the discovery packet at step 802 to extract the attribute data contained within the discovery packet, of the window or other GUI elements related to the Java applet 306. As noted above, one of the items of attribute data is the window handle of the browser window that houses the top level Java window of the applet 306. Since there could be more than one browser 310 running of the operating system 302 at any one time, the SSO Hook 400 needs to ensure that the correct credentials from the database 112 are being forwarded to the window. Hence at step 804 the SSO Hook also determines the handle of the browser 310 window housing the top level Java Window. The SSO Hook utilised the JNI Component 407 to make this determination as is further described below.

The window handle determined by the SSO Hook 400 is then matched at step 804 against the window handle forwarded to the SSO Hook in the discovery packet. In the event of a match, the SSO Hook 400 will know that the window identified by the handle is the correct window to receive the authentication credentials. Thus at step 806 the SSO Hook 400 dispatches the discovery packet, containing the attribute data to with window identified by the handle at step 804. As noted above, with reference to FIG. 6, the SSO Hook 400 maintains an internal queue of jobs that represent discovered applets and it is to one of these pending jobs to which attribute data is forwarded.

Figure 10:
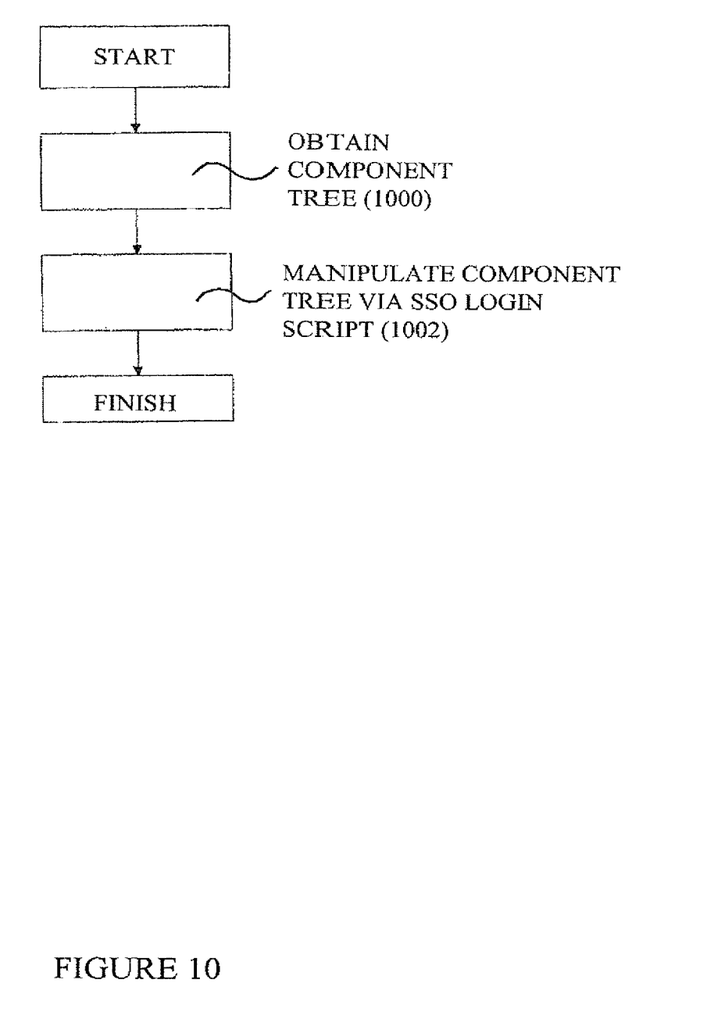
FIG. 10 is a flow chart illustrating the process carried out by the JNI DLL after being called by the SSO Hook.

The SSO Hook 400 utilises the JNI Component 407 to independently determine the handle of the browser 310 window that is hosting the Java applet. This process is now explained with reference to FIG. 10. At step 900 the JNI Component 407 receives the window handle from the SSO Hook 400. At step 902 a Java "Window" type is mapped into the window handle. This step enables the JNI Component 407 to determine whether the window handle forwarded by the SSO Hook 400 relates to the same window that hosts the top level Java window of the applet. At step 904, the window handle is then forwarded back to the SSO Hook 400.

After the attribute data is dispatched to the applet 306, the SSO Hook 400 and the JNI Component 407 are able to pass the authentication credentials to the applet 306 and thereby affect sign on to the resource. This process is described by reference to FIG. 10. The SSO Hook at step 1000 obtains a component tree from the attribute data. The component tree is obtained by querying the Virtual Machine 304 in a manner familiar to those skilled in the art. At step 1002 the component tree is manipulated by the SSO System Scripting Engine 408. Manipulation of the component tree of a graphical user interface window by an SSO Scripting Engine actually carries out the sign and thus enables access to the relevant resource. It is again a process familiar to those skilled in the art and will not be further detailed here.

Several benefits arise from the computer program code and method of the present invention in comparison to the programs and methods of the prior art. Principally, the computer program code and method allow Single Sign On systems to be used to access resources provided processes running on a virtual machine. Additionally, the computer program code and method allow communication with processes running on a virtual machine for other purposes, for example for testing virtual machine processes.

It will be realised that the present invention has been described by reference to a preferred embodiment and that any alterations and modification that are apparent to those skilled in the art are included within the spirit and scope of the invention as defined solely by the claims appended hereto.

What is claimed is:

1. A non-transitory computer readable medium containing computer software that retrieves and manipulates attribute information of a target process executed by a virtual machine, the software comprising:
    executable code that determines whether an interface window has been opened by the target process;
        executable code that hooks into a first application program that is executing the virtual machine to retrieve the attribute information from the target process, if the window is determined to have been opened;
        executable code that determines a communication address based on an operating system identifier that corresponds to the target process;
        executable code that communicates the attribute information that uniquely identifies the target process;
    executable code that parses the received attribute information to obtain a window identifier of the target process;
    executable code that determines which of a plurality of windows has a window identifier corresponding to that of the target process;
    executable code that generates a component tree for the window determined to have a window identifier matching that of the target process using the received attribute information; and
    executable code that provides communication access with the target process using the generated component tree.

2. The non-transitory computer readable medium of claim 1, wherein a second application program, executing outside the virtual machine, is provided with communication access with the target process and wherein the second application program is a single-sign-on application that cooperates with the target process to authenticate a user's access to the target process.

3. The non-transitory computer readable medium of claim 1, wherein a second application program, executing outside the virtual machine, is provided with communication access with the target process and wherein the second application program tests processes executing on the virtual machine.

4. The non-transitory computer readable medium of claim 1, wherein the virtual machine is a Java virtual machine.

* * * * *